Feb. 26, 1957  W. G. SPIEGELHALTER  2,782,612
FILTER FOR AIR CONDITIONING APPARATUS
Filed Dec. 5, 1955
FIG. 1
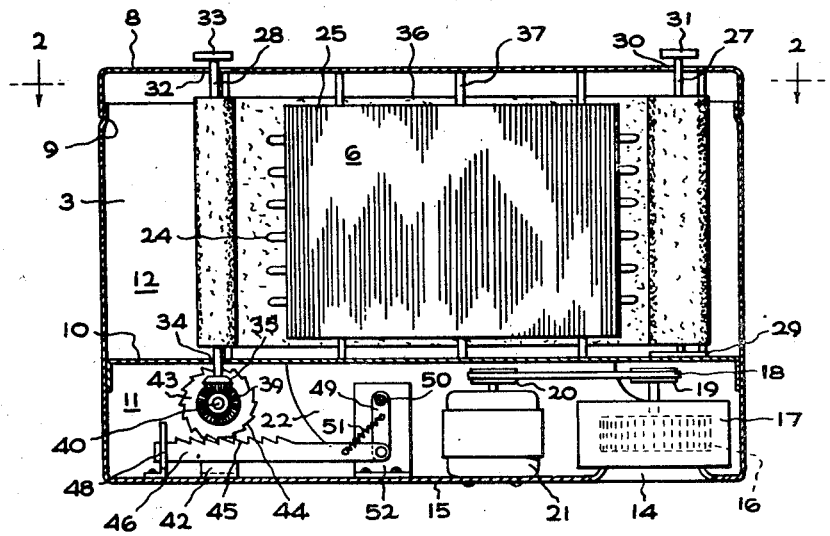
FIG. 2
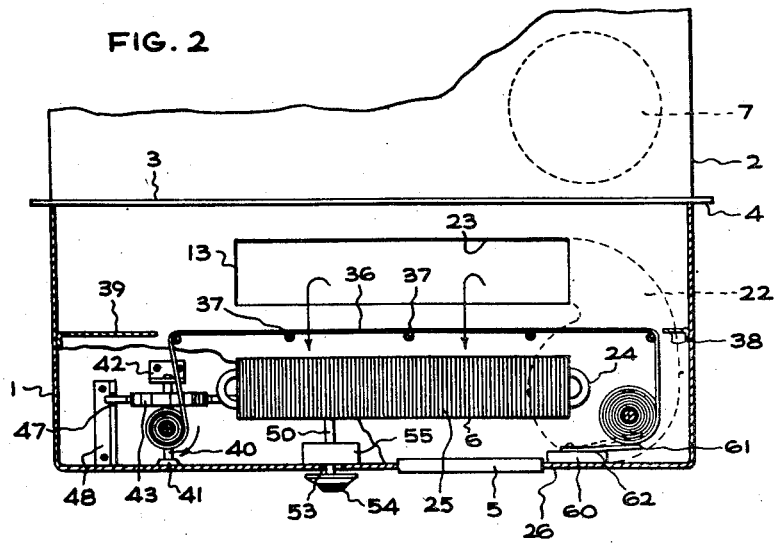
FIG. 3
INVENTOR.
WILLIAM G. SPIEGELHALTER
BY
HIS ATTORNEY

United States Patent Office 2,782,612
Patented Feb. 26, 1957

2,782,612

FILTER FOR AIR CONDITIONING APPARATUS

William G. Spiegelhalter, Erie, Pa., assignor to General Electric Company, a corporation of New York Application December 5, 1955, Serial No. 551,093

4 Claims. (Cl. 62—129)

My invention relates to air conditioning apparatus and more particularly to air filtering means for such apparatus.

In air conditioning apparatus of the type employed to condition air for an enclosure, it is usually necessary that some filtering means be provided for the air to be cooled which is circulated through the air conditioning apparatus. It is highly desirable to clean this air of entrained dust or lint before it is moved over the evaporator or cooling coil of the unit and discharged into the enclosure. Filtering of air to be conditioned has in the past been usually accomplished by a thin, porous slab of filtering material located in the air duct of the air conditioning apparatus. The air is moved through this filter slab which removes the entrained dust and lint. It can be seen that after the filter has been in operation for an extended period, it must be removed from the apparatus and either cleaned or discarded. Cleaning a filter is usually a time consuming and expensive operation and to discard the filter before its useful life has expired additionally increases the cost.

Accordingly it is an object of my invention to provide a new and improved arrangement for filtering the air circulated through air conditioning apparatus prior to its discharge into the enclosure to be conditioned.

A further object of my invention is to provide an improved inexpensive, self-replacing, filtering arrangement for an air conditioning unit in which the used filtering surfaces are automatically replaced according to the number of on-off operations of the apparatus.

A still further object of my invention is to provide a novel, self-replacing, air filter for air conditioning apparatus which is automatically shifted to replace the used filtering surfaces.

It is still another object of my invention to provide an improved, self-replacing air filter for air conditioning apparatus which is provided with its own replacement filter surfaces and which discontinues the operation of the apparatus when additional replacement surfaces are no longer available.

It is another object of my invention to provide a filtering arrangement for an air conditioning unit which is simple in construction, inexpensive, and efficient in operation and which may be used over long periods of unit operation before a new filtering arrangement need be substituted.

In carrying out my invention, I provide an air conditioning unit for conditioning the air within an enclosure which is provided with a refrigeration system including an evaporator or chilling unit over which air is circulated so that it may be cooled before being discharged into the enclosure. In order to filter the air moved over the evaporator, I provide a continuous filter which is arranged adjacent the evaporator in such a manner that successive portions of the filter can be presented to the circulating air for filtering purposes as the previously presented filter portions become used. I also preferably provide means to index the movement of the filter past the evaporator in accordance with the number of times the unit is operated. When all of the filtering surfaces are exhausted, the unit operation is discontinued through switching means arranged to detect the need for a completely new continuous filter.

The novel features which I believe to be characteristic of my invention are set forth with particularity in the appended claims. My invention, however, both as to its organization and method of operation may be best understood by reference to the following description taken in conjunction with the accompanying drawing in which:

Fig. 1 is a vertical sectional view of an air conditioning unit including my invention;

Fig. 2 is a partial horizontal view taken substantially along line 2—2 of Fig. 1; and Fig. 3 is a schematic diagram of an electrical circuit adapted for use with the air conditioning apparatus of Fig. 1.

Referring now to Fig. 2, I have shown therein a self-contained room air conditioner adapted for mounting in a window of the room to be conditioned. The air conditioner includes a section 1 projecting into the room and an outer section 2 which extends outside the room preferably into the outside atmosphere. Between the two sections 1 and 2, I position a partition 3 which divides my unit into an indoor and an outdoor compartment as defined by sections 1 and 2 respectively. I also provide an external gasket 4 around the unit at the point where my partition 3 is located to prevent leakage of outside air into the room. The indoor section 1 is preferably provided with a screened opening 5 through which conditioned air is discharged into the room and the outdoor section 2 is provided with openings (not shown) which permit the outside air to be drawn into the outdoor section and discharged back into the atmosphere. As is conventional in this type of air conditioning apparatus, some damper arrangement may be provided whereby a portion or all of the outside air may be conducted into the room for ventilating or mixing. This damper arrangement is preferably located so as to cooperate with the baffle 3. It will be noted that I have only partially shown the outdoor section 2 of my air conditioner in Fig. 2 and it should be understood that it may be of any suitable design usually found in air conditioners of this type wherein outside air is circulated through the outdoor section.

My air conditioning unit also includes a conventional mechanical refrigeration system having an evaporator 6, a compressor 7 and a condenser (not shown). Both the compressor and condenser are of the conventional type common to air conditioning apparatus and are suitably located within the air conditioner preferably in that portion of the air conditioner through which the outside air is circulated. As will be understood the compressor 7 and condenser are suitably connected in refrigerant flow circuit. In order to simplify the drawing, the interconnecting conduits between the components have been omitted.

During the operation of my air conditioner, room air is drawn into the indoor section 1 and moved over the evaporator coil 6 which extracts heat from the air cooling it. The cooled air is then discharged into the room. In section 2 of the air conditioner, wherein are preferably located the condensing unit and the compressor 7 of the refrigeration system, the heat extracted from the indoor air is rejected to the outside air by the condenser as it moves through section 2.

As thus far described, my air conditioner is arranged in two separate sections with the outdoor section containing the condenser and compressor 7 and the indoor section the evaporator 6 of the refrigeration system. The air conditioner may if desired be provided with a removable top wall 8 which is suitably received along its lower edge by a formed portion 9 extending along the top edge of the two sections 1, 2. This basic arrangement is illustrative of the type of air conditioners to which my invention may be adapted. More specifically, my invention deals with the construction of the compartment of the indoor section and the arrangement for supplying cool, cleaned air to the room to be conditioned. However, the embodiment of my invention, shown herein appurtenant to the indoor section of the air conditioner, is not necessarily so limited and may if desired be associated with the outdoor section or with both sections.

Referring now to Fig. 1, the indoor section 1 is provided with partitioning means 10 extending horizontally across the lower portion of section 1 and dividing section 1 into two sub-compartments 11 and 12. The partition 10 has a rectangular portion removed as shown in Fig. 2 to provide an opening 13.

In order to circulate the room air through section 1 of my air conditioner, I provide an opening 14 in the bottom wall 15 of section 1. The opening 14 communicates with the axial intake of air moving means such as a centrifugal fan 16 arranged for rotation about a vertical axis within a casing 17. The fan 16 is driven by means of a belt 18 suitably connected by means such as pulleys 19, 20 to an electric motor 21. The motor 21 is suitably mounted as shown in Fig. 1 on the bottom wall 15 of section 1 within the lower compartment 11. The fan motor may be energized as desired by separate switching means (not shown) or may be energized simultaneously with the operation of the air conditioner.

Although I have preferably shown a blower 16 driven through belt 18 by motor 21, it should be understood that any suitable type of air moving means may be employed as my invention lies primarily on the filtering arrangement. For instance a propeller-type fan may be used instead of a centrifugal blower and the motor 21 may be mounted elsewhere within my air conditioner. For instance, the motor 21 may be directly connected to the blower or fan instead of a belt drive and may be used simultaneously for driving the air moving means for the outside air.

Referring now to Fig. 2, the air drawn in through opening 14 by the fan 16 moves through a plenum chamber 22 having an enlarged open end 23 arranged within the compartment 11. As can be seen, the plenum chamber 22 is arranged as an extension of the fan casing 17. The open end of the chamber 23 is of the same dimensions and is in sealing relationship with the opening 13 in the partition 10 so as to communicate therewith.

As previously discussed, I have preferably located the evaporator 6 of my refrigeration system within indoor section 1 of my air conditioner so that it can extract heat from the room air circulated through the section. More specifically, my evaporator 6 is of the conventional fin and tube construction composed of tubing 24 arranged in a plurality of zig-zag turns with fins 25. Thus the evaporator 6 is arranged in a substantially vertical position as shown in Fig. 2 within the upper compartment 12 of section 1 in a plane parallel to the room air discharge opening 5 in the front wall 26 of section 1. My evaporator 6 may be positioned by any suitable mounting means (not shown) and is connected as discussed above within my closed refrigeration system by appropriate tubing. With this arrangement, air which is moved over the evaporator 6 where it is cooled by the refrigerant flowing through the coil 24 of the evporator may then subsequently pass through the discharge opening 5 in the unit front wall 26 and into the room to be conditioned.

The air within the enclosure or room generally acquires a considerable amount of entrained dust, dirt, or lint in everyday living and if this air is to be satisfactorily conditioned it is not sufficient to provide for cooling it but some provisions should be made for continuously cleaning it, or if outside air is brought into the room through the unit it must likewise be cleaned. I have therefore provided a filtering arrangement for use with my air conditioner which consists of a rolled-up strip of filtering material which may be unrolled and simultaneously rolled onto another roller as new filtering surface is needed. My filtering arrangement is therefore located in the path of the circulating room air prior to its discharge into the room to be conditioned.

More specifically, I position a pair of substantially vertical roller shafts 27, 28 within section 1, as shown in Fig. 1, which are laterally arranged on opposite sides of the evaporator 6 and disposed parallel to the surface of the fins 26. The shaft 27 is suitably mounted and is freely rotatably within bearing support 29 arranged on partition 10. The upper end of the roller shaft 27 extends through an aperture 30 in the top wall 8 of the unit and terminates in a manual operating knob 31. Appropriate means are provided (not shown) to maintain the shaft in the vertical position. Roller shaft 28 also has an upper end extending through an aperture 32 in the top wall 8 and terminates in a knob 33. This shaft 28 is also appropriately maintained in the vertical position by suitable means which are not shown. The lower end of roller shaft 28 extends through an aperture 34 in partition 10 and terminates in a bevel pinion gear 35. The pinion 35 forms a part of my filter shaft driving mechanism located in compartment 11 of section 1. Thus the roller shaft 27 is arranged to be freely rotatable in its bearing support 29 and the roller shaft 28 is arranged to be rotatably driven by its bevel pinion 35.

Referring now to Fig. 2, my filtering arrangement for the room air which is drawn into the indoor section 1 of my air conditioner and circulated over the evaporator 6 consists of an elongated tape or strip 36 of filtering material, such as porous paper, which is initially wound on the freely rotatably shaft 27 as shown in Fig. 2. The filter strip 36 is then partially unwound from the shaft 27 and its free end is passed around a plurality of vertical support rods 37 suitably mounted on the partition 10 in compartment 12 of section 1. Then its free end is attached by any convenient means to the driven roller shaft 28. For instance, the shaft 28 may be provided with a radial slot into which the free end of the strip 36 is inserted and then wound around the shaft to secure it in place.

Thus it will be seen in my preferred arrangement that the strip of filtering material 36 lies on the upstream side of evaporator 6 and room air before moving over the evaporator passes first through the filtering strip which cleans it before being discharged through opening 5 in the front wall 26 of section 1. Although I have preferably shown my filtering strip 36 located on the upstream side of the evaporator 6, it may also be located if desired on the downstream side without effecting the operation of my invention.

In order that the circulated air does not pass around the filter strip 36 and out the discharge opening 5 without being cleaned, I provide baffles 38 and 39 as shown in Fig. 2 which extend up to the point adjacent the filter strip where the strip enters and leaves the plane of the support rod 37 respectively. The baffles 38, 39 are suitably mounted on the interior of the end walls of section 1. Thus all the air which is moved towards the evaporator 6 must pass first through the filtering strip 36 as the baffles 38, 39 substantially seal the passages around the strip.

With the roll of filtering material on the roller shaft 27, a supply of fresh filtering material is readily available and may be rolled off the freely rotatable shaft 27 when the driven roller shaft 28 is rotated. In order to roll off a fresh portion of filtering strip, I therefore provide a driving mechanism for the roller shaft 28 which is actuated when my air conditioning unit is actuated to the "on" position. By moving the filter strip with the unit starting mechanism, I obtain automatically a replacement of the used filter strip portion. More specifically, I provide a bevel gear 39 as shown in Fig. 1 which meshes with the bevel pinion 35 on the lower end of the driven roller shaft 28. As shown in Fig. 2, the bevel gear 39 is fixedly mounted within the compartment 11 on a freely rotatable shaft 40 supported at one end by suitable journaling means such as boss 41 on the forward wall 26 of section 1. The shaft 40 is supported at its other end by a bracket 42 suitably attached to the bottom wall 15 of section 1.

In order to rotatably drive the shaft 40 and its fixed bevel gear 39, a toothed ratchet 43 is also fixedly secured to the shaft 40 adjacent the gear 39. The ratchet 43 contains peripherally spaced teeth 44 which are arranged to engage an opposing row of horizontally spaced teeth 45 on a rack 46 as shown in Fig. 1. This rack 46 is arranged for reciprocal movement and its forward end is loosely positioned in a slot 47 provided in a bracket 48 suitably secured such as by screws to the bottom wall 15 of section 1. The opposite end of the rack 46 is loosely pinned to a link 49 which is fixedly secured to control rod 50. I have provided a spring 51 connected at one end to rack 46 and at the other end to link 49. As can be seen in Fig. 1, the spring 51 resists any pivotable movement which increases the angle between the link and rack.

The control rod 50 is supported for rotatable movement within an upstanding bracket 52 suitably secured as by screws to the bottom wall 15 of section 1. The rod 50 extends at its forward end through an aperture 53 in the forward wall 26 of section 1 below the partition 10 and terminates in a control knob 54 as shown in Fig. 2. Rotation of control rod 50 by means of knob 54 functions to control the operation of the air conditioner of my invention as appropriate controls conventional to this type of air conditioning unit are connected to the control rod 50. One such control switch connected to the rod 50 is my unit starting switch 55 shown in Fig. 2 suitably supported on the rear of the unit front wall 26.

Referring now to Fig. 3, I have shown the switch arm 56 of the operation control switch 55 by which the motor of compressor 7 in my refrigeration system may be operated by connecting the compressor motor across a pair of supply conductors 57 and 58. The switch arm 56 is connected to the control rod 50 as discussed above so that rotation of the control knob 54 in a clockwise direction from that of the position of Fig. 1 will move the switch arm 56 into contact making engagement with contact 59. The closing of switch arm 56 however only partially connects the motor of compressor 7 into the circuit with the supply conductors 57, 58, as I have provided another switching means 60 shown in Fig. 2 between the compressor motor and the power supply. The switch 60 is suitably supported on the rear of the unit front wall 26 adjacent the roller shaft 27 and contains a movable contact arm 61. The switch 60 is in circuit closing position when the filter strip 36 is wound onto roller shaft 27 and the strip roll diameter large enough to hold the switch arm 61 into circuit closing engagement with a contact 62.

In the operation of my invention, the filter strip 36 is wound onto roller shaft 27 and its free end is pulled across the rear of the evaporator 6 and the rods 37. The strip end is then attached to the rod 28 and a few turns of the shaft 28 are made with the knob 33 to partially wind the strip end on the shaft. The operating knobs 31 and 33 may also be manually rotated in order to draw the filter strip 36 tightly between the two shafts 27, 28 as shown in Fig. 2. Thus a fresh strip of filter material is now interposed between the circulating air and the rear of the evaporator.

When the air conditioner is switched to the "on" position by rotation of the control knob 54, switch arm 56 is moved into engagement with contact 59. Switch 60 at this time is also closed as shown in Fig. 3 by the enlarged diameter of the strip 36 on shaft 27 compressing the switch arm 61 against contact 62. Thus a complete circuit is established and the motor of compressor 7 is energized by supply conductors 57 and 58 to initiate the operation of the refrigeration system. I have preferably shown in Fig. 3 the fan motor 21 in parallel with the compressor motor in the circuit and it is therefore simultaneously energized by conductors 57, 58 when switches 55 and 60 are closed. The fan 16 therefore rotates to draw room air through opening 14 in the bottom wall 15 of section 1 where it passes through the plenum chamber 22 arranged in compartment 11 to be subsequently discharged through opening 13 in partition 10 and into compartment 12. As the baffle 3 and associated damper means, if provisions for bringing in outside air are provided, seal section 1 from the outer section 2 of the air conditioner and as partitions 38 and 39 are arranged adjacent the end portions of the filter strip 36, the circulating air moves in the direction of the arrows through the filter strip 36 and over the evaporator 6 where it is both cleaned by the filter and cooled by the transfer of its heat to the evaporator 6. The air then moves back into the room to be cooled through the discharge opening 5 in the front wall 26 of the unit.

When the unit is to be de-activated, the control knob 54 is rotated in a counterclockwise direction rotating the control rod 50 and link 49 to slide the rack 46 to the right or toward the fan motor 21 as viewed in Fig. 1. The tooth on rack 46 which is in engagement with the corresponding one of the teeth 44 on the ratchet 43 moves into engagement with the adjacent ratchet tooth during this movement of the rack to the right. When the unit is once again activated by a clockwise rotation of the knob 54, link 49 rotates with the control rod 50 again sliding the rack 46 to the left as viewed in Fig. 1, against the holding action of spring 51. As corresponding teeth on the rack 46 and ratchet 43 are in engagement there is a resulting rotation in a clockwise direction of the ratchet 43 as the rack slides. It will be understood that the end of the rack 46 slides freely within the slot 47 of bracket 48 as the slot offers no resistance to the movement of the rack. Rotation of the ratchet 43 consequently rotates the pinion gear 39 through the shaft 40. As the gear 39 is meshed with bevel pinion gear 35 on the driven roller shaft 28, the shaft 28 is likewise rotated in the direction shown by the arrow in Fig. 2. Rotation of shaft 28 winds in a portion of the filter strip 36 onto the roller 28 and unwinds a portion of the same length from the roller shaft 27. Thus it will be understood that each time the unit is activated and de-activated a used portion of the filter strip 36 is wound on shaft 28 and a fresh portion of the same length is rolled off the roller 27. The length of strip moved during each operation of the unit may be of any desired length according to the operating conditions of the air conditioner and may be determined by the arrangement of the driving mechanism.

I have thus found that the useful life of the filter strip is proportional to the number of on-off operations of the air conditioner and an average number of on-off operations of the unit over a period of time will continuously present a fresh portion of filter material to the circulating air to insure that the circulated room air is continuously being properly filtered.

Referring now to Fig. 2, in order to automatically sense when the filter strip 36 is completely unwound from the roller shaft 27 and wound onto roller shaft 28 necessitating the replacement with a new filter roll, my feeler switch arm 61 which is gradually moving towards the dotted line position of Fig. 2 as the filter roll is used eventually dis-engages from the contact 62 thus opening the circuit to the motor of compressor 7 and fan 21. Thus the unit is de-activated and the operator cannot activate it until a new filter roll is replaced on shaft 27 and the switch 60 reset by the presence of the roll.

It will be seen that I have provided a filtering arrangement for an air conditioning unit which is capable of filtering the room air circulated through the unit over extended periods of operation due to its self-replacing filter characteristics. Through the use of my novel filter, a simplified replacement of used filter surfaces with new filter surfaces is accomplished and the need for frequent manual filter changes no longer arises. Furthermore the replacement of used filter surfaces with unused filter surfaces is accomplished in a simple manner automatically in an arrangement where the number of times the unit is operated determines the amount of filter surface that is replaced. In addition, the driving arrangement for replacing the used filter surfaces is simple in operation since, through the provision of the linkage between the filter driving arrangement and the air conditioner switching means, the operator automatically moves the filter strip when the unit is activated.

While in accordance with the patents statutes, I have described what at present is considered to be the preferred embodiment of my invention, it will be understood to those skilled in the art that various changes and modifications may be made therein without departing from my invention, and I, therefore, aim in the appended claims to cover all such changes and modifications as fall within the true spirit and scope of my invention.

What I claim as new and desire to secure by Letters Patent of the United States is:

1. Air conditioning apparatus for an enclosure comprising a refrigeration system including an evaporator, means to circulate air over said evaporator and into said enclosure, a filter comprising a flexible strip associated in part with said evaporator for filtering said circulating air, said filter strip movable adjacent said evaporator so as to present successive unused portions to said circulating air, and indexing means for moving said filter strip so as to present uniform successive unused portions of said strip to said circulating air, said indexing means acting to move a portion of said strip each time said apparatus is activated.

2. Air conditioning apparatus for an enclosure comprising a refrigeration system including an evaporator, means to circulate air over said evaporator and into said enclosure, a filter comprising a flexible strip associated in part with said evaporator for filtering said circulating air, said strip movable adjacent said evaporator so as to present successive unused portions to said circulating air, and indexing means for moving said strip so as to present uniform successive unused portions of said strip to said circulating air, said indexing means acting to move a portion of said strip each time said apparatus is activated, and means to de-activate said apparatus when said last unused filter portion has been presented to said circulating air.

3. Air conditioning apparatus for an enclosure comprising a refrigeration system including an evaporator, means to circulate air over said evaporator and into said enclosure, said evaporator arranged in a plane substantially perpendicular to said air flow, a pair of upstanding rotatable shafts arranged at opposite ends of said evaporator, one of said shafts being freely rotatable, a filter for said circulating air comprising a flexible strip wound on said freely rotatable shaft, said strip arranged to be simultaneously unwound from said freely rotatable shaft and wound on said other shaft parallel to said evaporator surface so as to present successive unused portions to said circulating air, indexing means to drive said other shaft so as to present uniform successive unused strip portions, said indexing means arranged to move a portion of said strip each time said apparatus is activated, and switch means responsive to the diameter of the filter roll on one of said shafts to de-activate said apparatus when said last unused filter portion has been presented to said circulating air.

4. Air conditioning apparatus for an enclosure comprising a refrigeration system including an evaporator, means to circulate air over said evaporator and into said enclosure, said evaporator arranged in a plane substantially perpendicular to said air flow, a pair of upstanding rotatable shafts arranged at opposite ends of said evaporator, one of said shafts being freely rotatable, a filter for said circulating air comprising a flexible strip wound on said freely rotatable shaft, said strip arranged to be simultaneously unwound from said freely rotatable shaft and wound on said other shaft parallel to said evaporator surface so as to present successive unused portions to said circulating air, indexing means to drive said other shaft so as to present uniform successive unused strip portions, switch means for activating said air conditioning apparatus, said indexing means arranged to move a portion of said strip each time said apparatus switch means are moved to the activating position, and switch means responsive to the diameter of said filter roll on one of said shafts to de-activate said apparatus when said last unused filter portion has been presented to said circulating air.

References Cited in the file of this patent

UNITED STATES PATENTS

| | | |
|---|---|---|
| 1,822,471 | Borden | Sept. 18, 1931 |
| 2,495,002 | Hart | Jan. 17, 1950 |
| 2,626,012 | Persons | Jan. 20, 1953 |